United States Patent
Boss et al.

(10) Patent No.: US 10,102,858 B1
(45) Date of Patent: Oct. 16, 2018

(54) DYNAMICALLY CHANGING AUDIO KEYWORDS

(71) Applicant: International Business Machines Corporation, Armonk, NY (US)

(72) Inventors: Gregory J. Boss, Saginaw, MI (US); Jeremy R. Fox, Georgetown, TX (US); Andrew R. Jones, Round Rock, TX (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/825,483

(22) Filed: Nov. 29, 2017

(51) Int. Cl.
*G10L 15/08* (2006.01)
*G10L 15/22* (2006.01)
*G10L 15/24* (2013.01)
*G10L 17/26* (2013.01)

(52) U.S. Cl.
CPC .............. *G10L 15/22* (2013.01); *G10L 15/24* (2013.01); *G10L 17/26* (2013.01); *G10L 2015/088* (2013.01); *G10L 2015/223* (2013.01); *G10L 2015/228* (2013.01)

(58) Field of Classification Search
CPC ... G10L 2015/088; G10L 15/20; G10L 15/22; G10L 2015/226; G10L 2015/227; G10L 2015/228; G10L 15/24
See application file for complete search history.

(56) References Cited

U.S. PATENT DOCUMENTS

| | | | |
|---|---|---|---|
| 5,899,972 A | 5/1999 | Miyazawa | |
| 7,882,032 B1 | 2/2011 | Hoffman | |
| 8,060,366 B1 * | 11/2011 | Maganti | H04L 65/403 |
| | | | 370/260 |
| 8,938,394 B1 | 1/2015 | Faaborg | |
| 9,318,107 B1 * | 4/2016 | Sharifi | G10L 15/08 |
| 9,368,105 B1 | 6/2016 | Freed | |

(Continued)

OTHER PUBLICATIONS

Hu, et al., "Wake-Up-Word Detection by Estimating Formants from Spatial Eigenspace Information", Proceedings of 2012 IEEE International Conference on Mechatronics and Automation, Aug. 5-8, Chengdu, China, pp. 2019-2024.

(Continued)

*Primary Examiner* — Eric Yen
(74) *Attorney, Agent, or Firm* — Edward J. Wixted, III; Ulysses Williams, III

(57) ABSTRACT

Aspects of the present invention disclose a method, computer program product, and system for managing a device utilizing user audio communications. The method includes one or more processors identifying an audio communication from a user. The method further includes, responsive to determining that the audio communication from the user does not include an activation command for a listening device, one or more processors determining a location of the user and information associated with the determined location of the user. The method further includes one or more processors determining an action to initiate on a listening device based on the audio communication, the determined information associated with the location of the user, and user preferences. The method further includes one or more processors initiating execution of the determined action on the listening device.

20 Claims, 3 Drawing Sheets

(56) References Cited

U.S. PATENT DOCUMENTS

| | | |
|---|---|---|
| 9,477,217 B2 | 10/2016 | Gardner |
| 9,502,039 B2 | 11/2016 | Foerster |
| 9,646,612 B2 * | 5/2017 | Sharifi .................... G10L 15/22 |
| 9,697,828 B1 * | 7/2017 | Prasad .................... G10L 15/18 |
| 9,747,926 B2 * | 8/2017 | Sharifi .................... G10L 25/51 |
| 9,972,320 B2 * | 5/2018 | Melendo Casado .... G10L 15/30 |
| 2003/0216919 A1 | 11/2003 | Roushar |
| 2008/0091426 A1 | 4/2008 | Rempel |
| 2008/0301135 A1 | 12/2008 | Alves |
| 2013/0339019 A1 * | 12/2013 | Giancarlo ............... G10L 15/04 704/251 |
| 2014/0278435 A1 * | 9/2014 | Ganong, III ............ G10L 15/22 704/275 |
| 2015/0161990 A1 * | 6/2015 | Sharifi .................... G10L 15/08 704/251 |
| 2016/0019892 A1 * | 1/2016 | Klimecki ................ G10L 15/26 704/235 |
| 2016/0379631 A1 * | 12/2016 | Wang ................... B60N 2/0232 704/275 |

OTHER PUBLICATIONS

Kepuska, et al., "A novel Wake-Up-Word speech recognition system, Wake-Up-Word recognition task, technology and evaluation", Nonlinear Analysis 71 (2009), 2009, © 2009 Elsevier Ltd., pp. e2772-e2789.

* cited by examiner

US 10,102,858 B1

DYNAMICALLY CHANGING AUDIO KEYWORDS

BACKGROUND

The present invention relates generally to the field of natural language processing, and more particularly to computational linguistics.

Speech recognition is a sub-field of computational linguistics that develop methodologies and technologies that enable recognition and translation of spoken language into text by computers. It is also known as "automatic speech recognition" (ASR), "computer speech recognition," or just "speech to text" (STT). Some speech recognition systems require "training" (also called "enrollment") where an individual speaker reads text or isolated vocabulary into the system. The system analyzes the person's specific voice and uses it to fine-tune the recognition of that person's speech, resulting in increased accuracy. Systems that do not use training are called "speaker independent" systems. Systems that use training are called "speaker dependent."

Speech recognition applications include voice user interfaces, such as voice dialing (e.g., "Call home"), call routing (e.g., "I would like to make a collect call"), domotic appliance control, search (e.g., find a podcast where particular words were spoken), simple data entry (e.g., entering a credit card number), preparation of structured documents (e.g., a radiology report), speech-to-text processing (e.g., word processors or emails), and aircraft (usually termed Direct Voice Input).

The term voice recognition or speaker identification refers to identifying the speaker, rather than what they are saying. Recognizing the speaker can simplify the task of translating speech in systems that have been trained on a specific person's voice, or it can be used to authenticate or verify the identity of a speaker as part of a security process.

SUMMARY

Aspects of the present invention disclose a method, computer program product, and system for managing a device utilizing user audio communications. The method includes one or more processors identifying an audio communication from a user. The method further includes, responsive to determining that the audio communication from the user does not include an activation command for a listening device, one or more processors determining a location of the user and information associated with the determined location of the user. The method further includes one or more processors determining an action to initiate on a listening device based on the audio communication, the determined information associated with the location of the user, and user preferences. The method further includes one or more processors initiating execution of the determined action on the listening device.

DETAILED DESCRIPTION

Embodiments of the present invention recognize that the performance of speech recognition systems is a function of processing logic relating to a computing device receiving a wake command and validation of the voice. Embodiments of the present invention recognize that speech recognition by machine is a very complex problem. Speech recognition by machine is complicated by the fact that vocalizations vary in terms of accent, pronunciation, articulation, roughness, nasality, pitch, volume, and speed. Speech is distorted by a background noise and echoes, electrical characteristics.

Embodiments of the present invention recognize that the accuracy of speech recognition by machine may vary with vocabulary size and confusability, speaker dependence versus independence, and isolated, discontinuous or continuous speech, task and language constraints, read versus spontaneous speech, and adverse conditions.

Embodiments of the present invention recognize that current approaches to speech recognition by machine use activation words and the same activation word that is recognized by a machine can be spoken in an audio or video broadcast, or by non-owners of the machine in the same room. Activation word speech recognition by machines can cause machines in audience homes and offices to start listening for input inappropriately, or possibly cause the machine to take an unwanted action. Computing devices that require a wake command by the primary user will not operate without a wake command word being recognized by the computing device.

Embodiments of the present invention provide a method that allows the computing device to determine whether a computing device bypasses the wake command machine speech recognition requirement in the computing device.

Figure 1:
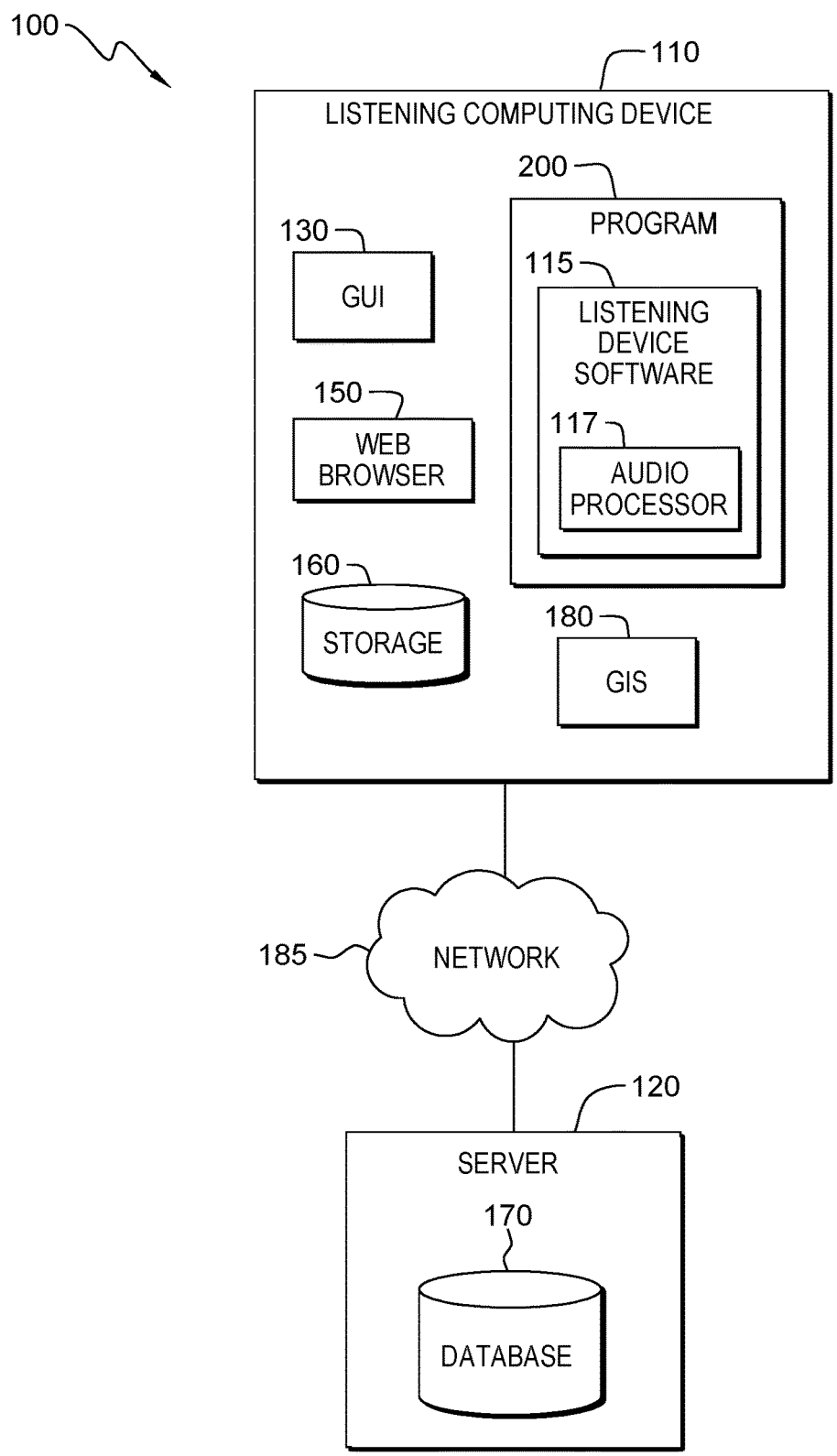
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes listening computing device 110 and server 120, all interconnected over network 185.

In one embodiment, listening computing device 110 includes graphical user interface (GUI) 130, web browser 150, storage 160, and program 200. The various programs on listening computing device 110 include a web browser, an electronic mail client, security software (e.g., a firewall program, a geo-locating program, an encryption program, etc.), an instant messaging (IM) application (app), an audio microphone program, and a communication (e.g., phone) application.

Listening computing device 110 may be a desktop computer, a laptop computer, a tablet computer, a specialized computer server, a smartphone, a listening device, a wearable device (e.g., smart watch, personal fitness device, personal safety device), or any programmable computer system known in the art with an interactive display or any other computer system known in the art. In certain embodiments, listening computing device 110 represents a computer system utilizing clustered computers and components that act as a single pool of seamless resources when accessed through network 185, as is common in data centers and with cloud computing applications. In general, listening computing device 110 is representative of any programmable electronic device or combination of programmable electronic devices capable of executing machine-readable program instructions and communicating with other computer devices via a network.

In another embodiment, listening computing device 110 is a cognitive microphone that records the voice of a user and through software located on one or more computing devices, such as listening computing device 110, sends the audible word spoken by a user to a voice to text application service located on server 120. Listening computing device 110 is constantly in a sentry type listening mode and is activated by a wake word. A wake word is a word recognized by a speech recognition server as an activation word that enables listening computing device 110 to begin to process words spoken by a user.

In one embodiment, graphical user interface 130 operates on listening computing device 110. In another embodiment, graphical user interface 130 operates on another computer in a server-based setting, for example, on a server computer (e.g., server 120). In yet another embodiment, graphical user interface 130 operates on listening computing device 110 simultaneously with a server computer interconnected through network 185 (e.g., server 120). Graphical user interface 130 may be any user interface used to access information from listening computing device 110, such as information gathered or produced by program 200. Additionally, graphical user interface 130 may be any user interface used to supply information to listening computing device 110, such as information supplied by a user to be used by program 200. In some embodiments, graphical user interface 130 may present a generic web browser used to retrieve, present, and negotiate resources from the Internet. In other embodiments, graphical user interface 130 may be a software or application that enables a user at listening computing device 110 access to network 185.

In yet another embodiment, a user of listening computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of listening computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to listening computing device 110, which may operate utilizing wired (e.g., USB port) or wireless network communications (e.g., infrared, NFC, etc.). Listening computing device 110 may include components, as depicted and described in further detail with respect to FIG. 3, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of listening computing device 110 to access a webpage over network 185. In the depicted environment, web browser 150 resides on listening computing device 110. In other embodiments, web browser 150, or similar web browsers, may reside on other computing devices capable of accessing a webpage over network 185.

Storage 160 (e.g., a database) located on listening computing device 110, represents any type of storage device capable of storing data that is accessed and utilized by listening computing device 110. In other embodiments, storage 160 represents multiple storage devices within listening computing device 110. Storage 160 stores information such as, but not limited to, account information, credentials for authentication, user preferences, lists of preferred users, previously visited websites, history of visited Wi-Fi portals, and the history of the location of the computing device. Storage 160 contains data utilized by listening computing device 110. In an example, storage 160 contains a history of wake commands utilized by listening computing device 110. In another example, storage 160 contains data of user configurations of listening computing device 110. In this example, a user is capable of storing data of user preferences for the operational settings of listening computing device 110.

Geographic information system (GIS) 180 is a system designed to capture, store, manipulate, analyze, manage, and present all types of geographic data. In general, GIS 180 describes any information system that integrates, stores, edits, analyzes, shares, and displays geographic information. Listening computing device 110 can allow server 120, through a handshake, to remotely access GIS 180 on listening computing device 110. In some embodiments, GIS 180, on listening computing device 110, contains GPS receivers. In other embodiments, GIS 180 contains radio-frequency identification (RFID) tags. In still other embodiments, GIS 180 contains other sensors and/or receivers used by program 200 to determine the location of listening computing device 110. GIS 180 may utilize GPS or triangulation techniques to determine the physical location of listening computing device 110.

In another example, GIS 180 may utilize a series of RFID tag readers to locate a server with an RFID tag. GIS 180 contains a globally unique identifier (GUID) that is assigned for each computing device. The GUID can be the MAC address for the device. The device is tracked through the GUID located on GIS 180.

GIS 180 operates to enhance program 200 to increase the accuracy or amount of location-related information that program 200 obtains. GIS 180 utilizes GUID information, combined with a sampling of data collected by GIS 180, to make determinations regarding the location of listening computing device 110. In an example embodiment, GIS 180 may receive a series of data points collected by the GUID. GIS 180 may use the received data points to create a path and compare that path to GUID information corresponding to the location of the received data points.

Program 200 is a program, located on listening computing device 110, that dynamically changes an audio keyword. In an embodiment, program 200 includes the subprograms; listening device software 115 and audio processor 117, a sub program of listening device software 115.

Listening device software 115 is a cloud-based sub program, of program 200, that allows a user to connect to and control listening computing device 110. Listening device software 115 contains a sub program, audio processor 117, that allows listening computing device 110 to recognize an audible word spoken by a user, and to enable listening computing device 110 to record the audible word spoken by a user. After listening computing device 110, through audio processor 117, has recorded the audible word spoken by a user, listening computing device 110, through listening device software 115, processes the audible word spoken by a user to a voice service located on listening computing device 110.

Listening device software 115 provides the user the ability to interface with listening computing device 110 and to function as a control center that allows a user to change network connectivity, allows a user to configure date and time, allows a user to set the language listening computing device 110 recognizes, and the ability to sync listening computing device 110 with one or more programs located on listening computing device 110. Listening device software 115 allows a user the capability to integrate listening computing device 110 to one or more programs stored on listening computing device 110. In an example, listening device software 115 allows a user to connect listening computing device 110 to a music service application located on listening computing device 110. In this another example, listening device software 115 provides the capability for a user to integrate a car ordering service application on listening computing device 110 with listening device software 115.

In general, network 185 can be any combination of connections and protocols that will support communications among listening computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes database 170.

Database 170 may be a repository that may be read by program 200. In an example embodiment, database 170 can include information, such as Voice ID data of a primary user. The primary user stores a pre-recorded voice print in database 170 that is used to identify the primary user. In some embodiments, database 170 may access and retrieve information from another database or storage device that has voice print information for other users. In an example, program 200 may access other computing devices to retrieve data of voice print information of the users of the computing devices. In other embodiments, a program on server 120 may prompt and update database 170 with information. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to program 200. Database 170 operates to enhance program 200 by increasing the accuracy or amount of data available to program 200. Database 170 stores keyword data of typical language between one or more users that would indicate a telephone call, video conference, or live conversation between one or more users.

In an embodiment, server 120 is capable of initiating a handshake process between server 120 and listening computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a massage to listening computing device 110 indicating that server 120 wants to establish a communication channel in order to gain access to programs on listening computing device 110.

Figure 2:
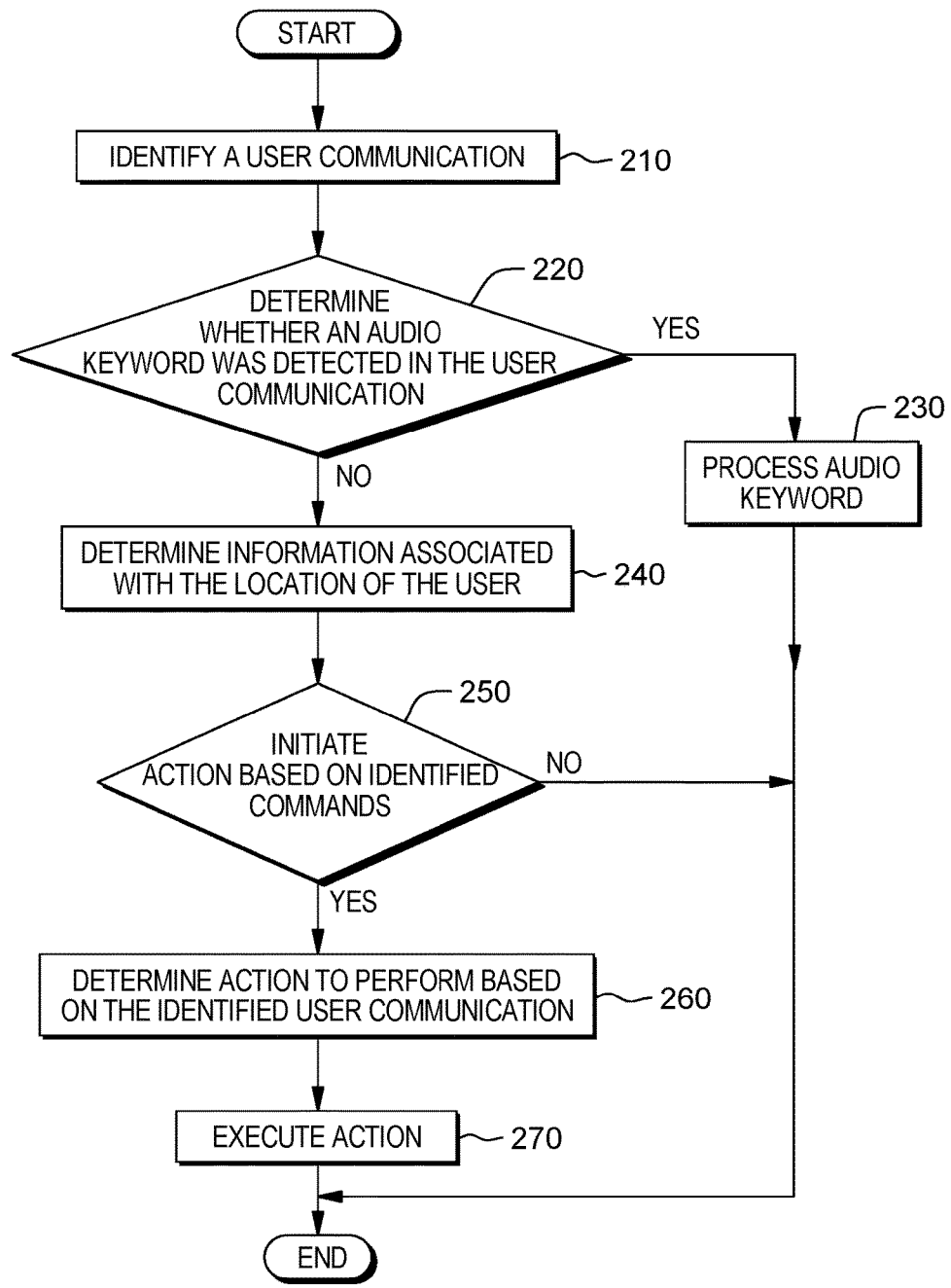
FIG. 2 is a flowchart depicting the operational steps of a program for dynamically changing a wake command, in accordance with an embodiment of the present invention.

FIG. 2 is a flowchart depicting operational steps of program 200, a program for dynamically changing an audio keyword, in accordance with an embodiment of the present invention.

In step 210, program 200 identifies a user communication. In an embodiment, program 200 operates in a listening state and awaits a command, request, or question from a user. In an example, program 200 identifies a spoken command and determines that the command is the 'wake command.' In this example, program 200 receives the 'wake command' and activates listening computing device 110. In another example, program 200 receives a user communication and identifies that the command, request, or question is inaudible because program 200 is unable to recognize the communication.

In decision step 220, program 200 determines whether an audio keyword was detected. In an example, program 200 identifies the user communication in step 210 and compares the identified voiceprint to a pre-recorded user wake command voiceprint on storage 160 or database 170 to determine if the voiceprint matches. In response to determining that an audio keyword was detected in the user communication (decision step 220, "yes" branch), program 200 processes the audio keyword. In an embodiment, program 200 determines whether the wake command came from the primary user by verifying the voice print with the voice id on database 170. In an example, program 200 processes the positive wake command detected after verification and activates listening computing device 110 to emerge from sentry mode (step 230).

In step 230, program 200 processes the positive audio keyword detected as verified by the primary user and the normal wake command processing occurs. In an example, program 200 determines that a command, question, or a request was preceded by the verified user speaking the wake command, and program 200 activates listening computing device 110.

In response to determining that no audio keyword was detected in the user communication (decision step 240, "no" branch), program 200 determines information associated with the location of the user. In an embodiment, program 200 utilizes GIS 180 to determine, and acquire, information associated with the location of users in the room through detecting one or more mobile devices. In an example, program 200 uses GPS information, from GIS 180, to determine information associated with the location users in the room in relation to listening computing device 110. Program 200 accesses GIS 180 to utilize GPS or triangulation techniques to determine, and update, the physical location of one or more mobile devices of one or more users.

In another embodiment, program 200 determines the number of users in the room via active listening and active awareness of more than one voice print. In an example, program 200, through listening computing device 110, accesses database 170 to retrieve data of the Voice ID of the primary user of listening computing device 110. In this example, program 200 determines the information associated with the location of users in the room by analyzing the number of unique voice prints that program 200 detects. Program 200 is capable of determining if the primary user is present in the room through analyzing and comparing the detected voice prints with the pre-recorded voice print of the primary user located on database 170. Program 200 is capable of detecting if a primary user is on a phone call through comparing an analysis of the conversation with data of common keywords used in a phone conversation, such as the word "hello" that is not spoken in conjunction with a separate voice print.

In decision step 250, program 200 determines whether to initiate an action based on identified commands. In an embodiment, program 200 utilizes the information associated with the location of the user, determined in step 240, to determine whether to initiate an action. In an example, program 200 determines (decision step 250, "yes" branch) that program 200 will initiate an action on listening computing device 110 by utilizing the information from step 240. In this example, in step 240, program 200 accesses network activity to search for active user phones, tablets, or other computing devices that contain a log of associated location information. Program 200 identifies information associated with the location of listening computing device 110 and verifies the location of listening computing device 110 by utilizing known Internet protocol address routing mechanisms. In this example, program 200 determines an action, such as to wake up listening computing device 110, based on an identified information from step 240 verifying that the primary user is the only user present in the environment by analyzing the last known location of the primary user, though GIS 180, and by analyzing the location of any other user in the room. Program 200 determines that no anomalies have been detected in the information that program 200 identified, and program 200 determines that program 200 will perform an action despite the fact that an audio keyword was not detected in decision step 220.

In another embodiment, program 200 utilizes motion sensors, video surveillance, and other technology to determine whether to initiate an action based on the identified location of the user. In an example, a motion sensor, connected to listening computing device 110, detects a user in the room and compares the information associated with the location of the user in step 240, the voice-print of the primary user to the voice print id located on database 170 to determine the user to be the primary user. Program 200 determines, through voice recognition and motion sensors, that no other user is present in the room and program 200 determines that program 200 will perform an action, such as processing a request to turn off a music application.

In another embodiment, program 200 determines that program 200 will initiate an action based on the identified command utilizing information associated with the location of the user as determined by video surveillance technology. In this example, program 200 utilizes facial recognition technology to determine that program 200 will initiate an action based on the information associated with the location of a user. Program 200 determines whether program 200 will initiate the action based on the information associated with the location of the user.

In another embodiment, program 200 is capable of determining whether to initiate an action based on the information associated with the location of the user as determined by eye scan technology. In an example, program 200 disables the wake command requirement utilizing eye scan technology. In this example, program 200 is capable of detecting if a user is looking at a specific target, such as listening computing device 110 and utilizing the information associated with the location of the user as determined from the eye scan. In this example, a user would look at a pre-defined location point, if not listening computing device 110, and speak a request, command, or question and program 200 determines the information associated with the user based on the location of the user. Listening computing device 110 is activated in response to the request, command, or question without the wake command.

In another embodiment, program 200 determines that program 200 is not capable of initiating an action (decision step 250, "no" branch) program 200 was unable to confirm information associated with the location of the user that enables program 200 to initiate an action based on the location information determined in step 240. In an example, program 200 determines that the primary user is not present in the room. Program 200 determines that program 200 cannot initiate an action when the primary user is not in the room and returns to sentry mode and ends the program.

In step 260, program 200 determines the action to perform based on the identified user communication and user preferences. In an embodiment, program 200 determines an action to perform based on the command given by the primary user and user preferences stored in storage 160 or database 170. In an example, program 200 activates listening computing device 110 in response to the request from the user. In this example, program 200 receives a "turn on some music" command from a user. Program 200 retrieves information of a history of music selections from the user, and a history of the frequency of music selections from a user. Program 200 determines that the program 200 will play a song that program 200 determines the user to enjoy based on the history of the song being played and the time of day, when the user returns home, that the user typically plays the song.

In another example, program 200 determines an action to perform based on a question identified from the user. In this example, program 200 determines an action to perform based on the fact that more than one person is in the room. Program 200 identifies that the user has requested the user's credit card information. In this example, program 200 challenges the primary user to provide further authentication of the identity of the primary user in addition to the voice print because an anomaly was detected after the processing logic of determining information associated with the location of the user was performed in step 240. In this example, program 200 determines, in light of the environment determined by program 200, that program 200 will perform an action that limits the amount of sensitive information broadcasted over audio.

In another example, program 200 determines action to perform based on a request from the user. In this example, program 200 identifies a request from a user to "turn on the heat." Program 200 retrieves a history of temperature selections from a user that correspond to the temperature fluctuations outside and determines an action to perform based on the request from the user in combination with a history of information related to the request stored to storage 160 or database 170.

In step 270, program 200 executes the action. In an embodiment, program 200 executes a command from a user. In an example, program 200 receives an "turn on some music" command from a user. Program 200 activates a music application and determines a song to play based on an analysis of a history of musical selections from the user. In this example, program 200 may present a user with more than one choice of music based on user preferences and a history of a selection of music from the user.

In another example, program 200 executes an action based on a request from a user. In this example, program 200 identifies a request from the user to "change the credit card information" in an online e-commerce user profile. Program 200, based on the action determined in step 260 that authenticates the user, accessed storage 160 or database 170 and changes the default credit card based on the user's frequent use of the credit card.

In another example, program 200 identifies a command from a user to "turn on the heat" in the home. Program 200, based on the information determined in step 260, activates the heat at a setting of seventy degrees based on user preferences.

Figure 3:
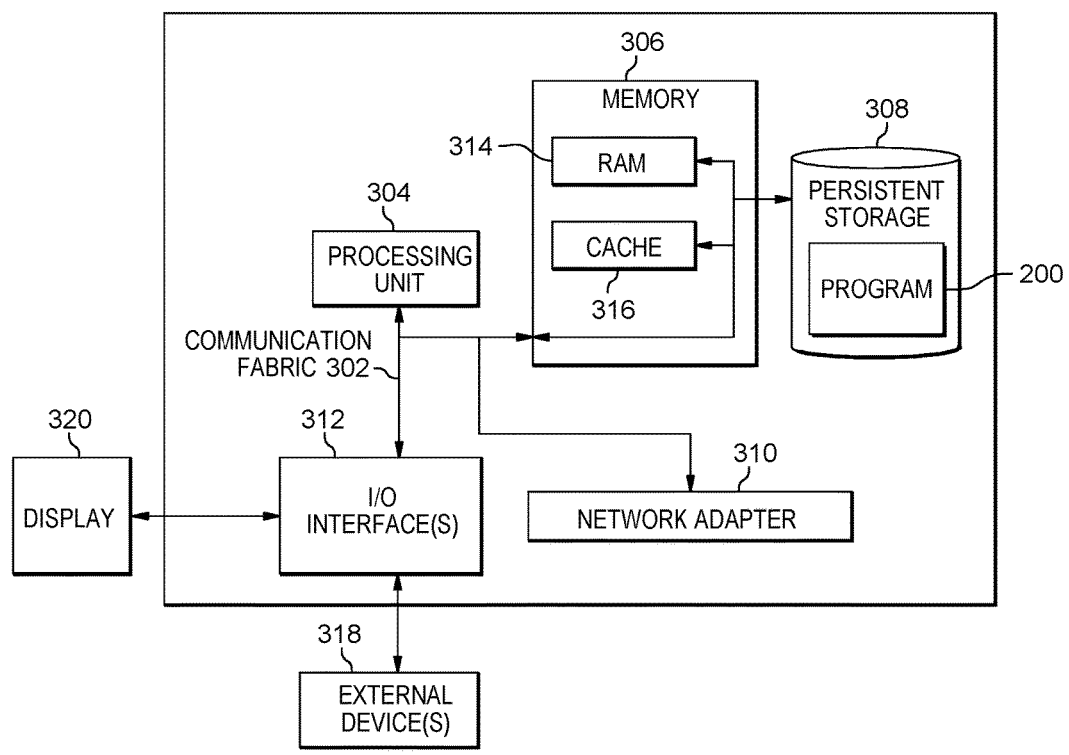
FIG. 3 is a block diagram of components of a computer system, such as the server computer of FIG. 1, in accordance with an embodiment of the present invention.

FIG. 3 depicts a block diagram of components of server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 120 includes communications fabric 302, which provides communications between cache 316, memory 306, persistent storage 308, network adapter 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program 200 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Network adapter 310, in these examples, provides for communications with other data processing systems or devices. In these examples, network adapter 310 includes one or more network interface cards. Network adapter 310 may provide communications through the use of either or both physical and wireless communications links. Program 200 may be downloaded to persistent storage 308 through network adapter 310.

I/O interface(s) 312 allows for input and output of data with other devices that may be connected to server computer 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a device utilizing user audio communications, the method comprising:
   identifying, by one or more processors, an audio communication from a user;
   responsive to determining that the audio communication from the user does not include an activation command for a listening device, determining, by one or more processors, a location of the user and information associated with the determined location of the user;
   determining, by one or more processors, an action to initiate on a listening device based on the audio communication, the determined information associated with the location of the user, and user preferences; and
   initiating, by one or more processors, execution of the determined action on the listening device.

2. The method of claim 1, further comprising:
   responsive to determining that the audio communication from the user includes the activation command for the listening device, matching, by one or more processors, a voice identification for the user with a stored voice identification; and
   activating, by one or more processors, the listening device, wherein activating the listening device causes the listening device to process one or more commands.

3. The method of claim 1, wherein determining a location of the user and information associated with the determined location of the user further comprises:
   determining, by one or more processors, information associated with the location of one or more users by detecting one or more mobile devices; and
   updating, by one or more processors, the location of one or more users by monitoring the one or more detected mobile devices.

4. The method of claim 1, wherein determining a location of the user and information associated with the determined location of the user further comprises:
   retrieving, by one or more processors, a voice identification profile of the user; and determining, by one or more processors, a physical presence of the user, by analyzing and comparing the retrieved voice identification profile of the user.

5. The method of claim 4, wherein initiating execution of the determined action on the listening device further comprises:
responsive to determining that the physical presence of the user was confirmed utilizing the retrieved voice identification profile, identifying, by one or more processors, a command from the user;
determining, by one or more processors, utilizing the voice identification profile and a motion sensor, that the location does not include a detected physical presence of an additional user; and
initiating, by one or more processors, execution of an action that corresponds to the identified command from the user.

6. The method of claim 1, wherein the location of the user and information associated with the determined location of the user is determined utilizing motion sensors, video feed data, voice print identification, eye scan technology, and infrared technology.

7. The method of claim 1, further comprising:
determining, by one or more processors, the action to initiate based on identified audio communication and one or more user preferences;
detecting, by one or more processors, an anomaly in the determined information associated with the location of the user; and
activating, by one or more processors, an authentication protocol in response to the determined anomaly.

8. A computer program product for managing a device utilizing user audio communications, the computer program product comprising:
one or more computer readable storage media and program instructions stored on the one or more computer readable storage media, the program instructions comprising:
program instructions to identify an audio communication from a user;
responsive to determining that the audio communication from the user does not include an activation command for a listening device, program instructions to determine a location of the user and information associated with the determined location of the user;
program instructions to determine an action to initiate on a listening device based on the audio communication, the determined information associated with the location of the user, and user preferences; and
program instructions to initiate execution of the determined action on the listening device.

9. The computer program product of claim 8, further comprising program instructions, stored on the one or more computer readable storage media, to:
responsive to determining that the audio communication from the user includes the activation command for the listening device, match a voice identification for the user with a stored voice identification; and
activate the listening device, wherein activating the listening device causes the listening device to process one or more commands.

10. The computer program product of claim 8, wherein the program instructions to determine a location of the user and information associated with the determined location of the user further comprise program instructions to:
determine information associated with the location of one or more users by detecting one or more mobile devices; and
update the location of one or more users by monitoring the one or more detected mobile devices.

11. The computer program product of claim 8, wherein the program instructions to determine a location of the user and information associated with the determined location of the user further comprise program instructions to:
retrieve a voice identification profile of the user; and
determine a physical presence of the user, by analyzing and comparing the retrieved voice identification profile of the user.

12. The computer program product of claim 11, wherein the program instructions to initiate execution of the determined action on the listening device further comprise program instructions to:
responsive to determining that the physical presence of the user was confirmed utilizing the retrieved voice identification profile, identify a command from the user;
determine, utilizing the voice identification profile and a motion sensor, that the location does not include a detected physical presence of an additional user; and
initiate execution of an action that corresponds to the identified command from the user.

13. The computer program product of claim 8, wherein the location of the user and information associated with the determined location of the user is determined utilizing motion sensors, video feed data, voice print identification, eye scan technology, and infrared technology.

14. The computer program product of claim 8, further comprising program instructions, stored on the one or more computer readable storage media, to:
determine the action to initiate based on identified audio communication and one or more user preferences;
detect an anomaly in the determined information associated with the location of the user; and
activate an authentication protocol in response to the determined anomaly.

15. A computer system for managing a device utilizing user audio communications, the computer system comprising:
one or more computer processors;
one or more computer readable storage media; and
program instructions stored on the computer readable storage media for execution by at least one of the one or more processors, the program instructions comprising:
program instructions to identify an audio communication from a user;
responsive to determining that the audio communication from the user does not include an activation command for a listening device, program instructions to determine a location of the user and information associated with the determined location of the user;
program instructions to determine an action to initiate on a listening device based on the audio communication, the determined information associated with the location of the user, and user preferences; and
program instructions to initiate execution of the determined action on the listening device.

16. The computer system of claim 15, further comprising program instructions, stored on the computer readable storage media for execution by at least one of the one or more processors, to:

responsive to determining that the audio communication from the user includes the activation command for the listening device, match a voice identification for the user with a stored voice identification; and activate the listening device, wherein activating the listening device causes the listening device to process one or more commands.

17. The computer system of claim 15, wherein the program instructions to determine a location of the user and information associated with the determined location of the user further comprise program instructions to:

determine information associated with the location of one or more users by detecting one or more mobile devices; and update the location of one or more users by monitoring the one or more detected mobile devices.

18. The computer system of claim 15, wherein the program instructions to determine a location of the user and information associated with the determined location of the user further comprise program instructions to:

retrieve a voice identification profile of the user; and determine a physical presence of the user, by analyzing and comparing the retrieved voice identification profile of the user.

19. The computer system of claim 18, wherein the program instructions to initiate execution of the determined action on the listening device further comprise program instructions to:

responsive to determining that the physical presence of the user was confirmed utilizing the retrieved voice identification profile, identify a command from the user;

determine, utilizing the voice identification profile and a motion sensor, that the location does not include a detected physical presence of an additional user; and initiate execution of an action that corresponds to the identified command from the user.

20. The computer system of claim 15, further comprising program instructions, stored on the computer readable storage media for execution by at least one of the one or more processors, to:

determine the action to initiate based on identified audio communication and one or more user preferences;

detect an anomaly in the determined information associated with the location of the user; and activate an authentication protocol in response to the determined anomaly.

* * * * *